US009794464B2

(12) United States Patent
Uchihara (10) Patent No.: US 9,794,464 B2
(45) Date of Patent: Oct. 17, 2017

(54) IMAGE CAPTURING SYSTEM, IMAGE CAPTURING APPARATUS, CONTROL METHOD, AND RECORDING MEDIUM

(71) Applicant: CANON KABUSHIKI KAISHA, Tokyo (JP)

(72) Inventor: Masato Uchihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 24 days.

(21) Appl. No.: 14/674,713

(22) Filed: Mar. 31, 2015

(65) Prior Publication Data

US 2015/0281551 A1    Oct. 1, 2015

(30) Foreign Application Priority Data

Apr. 1, 2014 (JP) ................................. 2014-075728
Feb. 25, 2015 (JP) ................................. 2015-035631

(51) Int. Cl.
*H04N 5/232* (2006.01)
*H04N 5/357* (2011.01)

(52) U.S. Cl.
CPC ....... *H04N 5/23206* (2013.01); *H04N 5/3572* (2013.01)

(58) Field of Classification Search
CPC .. H04N 5/3572; H04N 5/23206; H04N 5/357; H04N 5/23229
See application file for complete search history.

(56) References Cited

U.S. PATENT DOCUMENTS

2010/0328480 A1* 12/2010 Kikuchi ............... H04N 5/3572
                                                          348/222.1

FOREIGN PATENT DOCUMENTS

JP    2011-010214 A    1/2011
JP    2011-217087 A    10/2011

OTHER PUBLICATIONS

Mar. 28, 2016 Japanese Office Action that issued in Japanese Patent Application No. 2015035631.

* cited by examiner

*Primary Examiner* — Ahmed A Berhan
(74) *Attorney, Agent, or Firm* — Cowan, Liebowitz & Latman, P.C.

(57) ABSTRACT

In an image capturing system, an image capturing apparatus transmits information indicating set capturing conditions to an information processing apparatus. The information processing apparatus obtains a recovery filter corresponding to predetermined capturing conditions based on the information, and transmits the recovery filter to the image capturing apparatus. Upon receiving the recovery filter corresponding to the predetermined capturing conditions from the information processing apparatus, the image capturing apparatus stores the filter in a storage device. Upon obtaining an image signal by capturing, the image capturing apparatus performs recovery processing by applying the received recovery filter to the image signal.

17 Claims, 7 Drawing Sheets

| 0.12 |  | -0.25 |  | 0.12 |
|------|--|-------|--|------|
|      |  |       |  |      |
| -0.25 |  | 1.34 |  | -0.25 |
|      |  |       |  |      |
| 0.12 |  | -0.25 |  | 0.12 |

<<CAPTURING INFORMATION HISTORY>>
USER ID : 01234
CAMERA ID : 02368
LENS ID : 1023

F: APERTURE VALUE  2.8 – 22
Z: FOCAL DISTANCE  24 – 70 (UNIT:mm)
D: SUBJECT DISTANCE  30 – ∞ (UNIT:cm)
Num: USE COUNT FOR CAPTURING

■ MACRO (CAPTURING COUNT:25)

| F | Num | Z | Num | D | Num |
|---|---|---|---|---|---|
| 2.8 | 20 | 24 | 0 | 30 | 5 |
| 4.0 | 5 | 35 | 0 | 40 | 3 |
| 5.6 | 0 | 50 | 0 | 50 | 15 |
| 8.0 | 0 | 70 | 25 | 60 | 2 |

■ PORTRAIT (CAPTURING COUNT:90)

| F | Num | Z | Num | D | Num |
|---|---|---|---|---|---|
| 2.8 | 80 | 24 | 5 | 200 | 20 |
| 4.0 | 10 | 35 | 10 | 300 | 50 |
| 5.6 | 0 | 50 | 50 | 400 | 20 |
| 8.0 | 0 | 70 | 25 | | |

■ MOVING OBJECT(CAPTURING COUNT:40)

| F | Num | Z | Num | D | Num |
|---|---|---|---|---|---|
| 2.8 | 40 | 24 | 0 | 1000 | 2 |
| 4.0 | 0 | 35 | 0 | 1500 | 12 |
| 5.6 | 0 | 50 | 0 | 2000 | 8 |
| 8.0 | 0 | 70 | 40 | 2500 | 8 |

■ LANDSCAPE (CAPTURING COUNT:50)

| F | Num | Z | Num | D | Num |
|---|---|---|---|---|---|
| 8.0 | 5 | 24 | 20 | ∞ | 50 |
| 11 | 15 | 35 | 30 | | |
| 16 | 25 | 50 | 0 | | |
| 22 | 5 | 70 | 0 | | |

FIG. 9

<<RECOVERY FILTER TRANSMISSION LIST>>
CAMERA ID : 02368
LENS ID : 1023

```
        P0      Pmin    Pmax
      ------------------------
F :    2.8     2.8     2.8
Z :    70      70      70
D :    50      30      100
```

FIG. 10

IMAGE CAPTURING SYSTEM, IMAGE CAPTURING APPARATUS, CONTROL METHOD, AND RECORDING MEDIUM

BACKGROUND OF THE INVENTION

Field of the Invention

The present invention relates to an image capturing system, an image capturing apparatus, a control method, and a recording medium, and particularly to correction processing that is performed by applying a predetermined filter to an image capturing signal.

Description of the Related Art

In an image capturing apparatus such as a digital camera, various correction processes are applied to an image signal obtained by capturing. One of the correction processes to be applied is recovery processing of applying a recovery filter based on an optical transfer function (OTF) unique to an imaging optical system to reduce the influence, on the image signal, of aberration or diffraction arising from the characteristic of the imaging optical system (Japanese Patent Laid-Open No. 2011-217087).

The influence of aberration or diffraction on the image signal changes depending on the optical transfer function of a mounted imaging optical system as in a lens interchangeable camera. In addition, the influence changes depending on even capturing conditions such as the focal distance, aperture value, and subject distance that were set at the time of capturing, and the image height position. To obtain a satisfactory correction effect, a different recovery filter is required in accordance with a combination of the optical transfer function of a selected imaging optical system, capturing conditions, and an image height position.

However, the data amount of a high-accuracy recovery filter tends to increase, and a large storage capacity is necessary to hold recovery filters corresponding to various conditions in the storage area. This is sometimes not practical in terms of the circuit scale.

Unlike this, there is a method of storing OTF coefficients smaller in data amount than the recovery filter for a plurality of capturing conditions, and applying interpolation, FFT, or the like to an OTF coefficient corresponding to finalized capturing conditions, thereby generating a recovery filter.

However, recovery filter generation processing requires a heavy computational load and takes time. When performing recovery processing on an image signal at the time of capturing, the next capturing cannot be performed before the completion of processing. Conventionally, when the user selects an image, it is necessary to generate a recovery filter and execute recovery processing cumbersomely.

SUMMARY OF THE INVENTION

The present invention was made in view of such problems in the conventional technique. The present invention provides an image capturing system, image capturing apparatus, control method, and recording medium capable of executing high-quality recovery processing at the time of capturing.

The present invention in its first aspect provides an image capturing system including an image capturing apparatus configured to obtain an image signal by capturing, and an information processing apparatus configured to provide, to the image capturing apparatus, a recovery filter for reducing influence that is included in the image signal and arises from an imaging optical system, the image capturing apparatus comprising: a first transmission unit configured to transmit information indicating a capturing condition to the information processing apparatus; an obtaining unit configured to obtain an image signal by capturing; a first reception unit configured to receive a recovery filter corresponding to a predetermined capturing condition from the information processing apparatus and store the recovery filter in a storage unit; and a recovery unit configured to perform recovery processing by applying the recovery filter received by the first reception unit to the image signal obtained by the obtaining unit, and the information processing apparatus comprising: a second reception unit configured to receive the information that has been transmitted by the first transmission unit and represents the capturing condition; and a second transmission unit configured to obtain the recovery filter corresponding to the predetermined capturing condition based on the information indicating the capturing condition, and transmit the recovery filter to the image capturing apparatus.

The present invention in its second aspect provides an image capturing system including an image capturing apparatus configured to obtain an image signal by capturing, and an information processing apparatus configured to provide, to the image capturing apparatus, a recovery filter for reducing influence that is included in the image signal and arises from an imaging optical system, the image capturing apparatus comprising: a first transmission unit configured to transmit information indicating a capturing condition to the information processing apparatus; an obtaining unit configured to obtain an image signal by capturing; a first reception unit configured to receive a recovery filter corresponding to a predetermined capturing condition from the information processing apparatus and store the recovery filter in a storage unit; and a recovery unit configured to perform recovery processing by applying the recovery filter received by the first reception unit to the image signal obtained by the obtaining unit, and the information processing apparatus comprising: a second reception unit configured to receive the information that has been transmitted by the first transmission unit and represents the capturing condition; and a second transmission unit configured to obtain the recovery filter corresponding to the predetermined capturing condition based on the information indicating the capturing condition, and transmit the recovery filter to the image capturing apparatus, wherein in a case where a recovery filter has not been stored in the storage unit when performing recovery processing, the recovery unit stores the image signal obtained by the obtaining unit without performing recovery processing, and after the first reception unit receives a recovery filter, performs recovery processing on the image signal by using the recovery filter.

The present invention in its third aspect provides an image capturing apparatus comprising: an obtaining unit configured to obtain an image signal by capturing; a prediction unit configured to predict a capturing condition set at the time of capturing based on information indicating a set capturing condition; a transmission unit configured to transmit, to an external apparatus, information indicating a capturing condition predicted by the prediction unit; a reception unit configured to receive a recovery filter corresponding to the predicted capturing condition from the external apparatus; and a recovery unit configured to perform recovery processing by applying the recovery filter received by the reception unit to the image signal obtained by the obtaining unit.

The present invention in its fourth aspect provides an image capturing apparatus comprising: an obtaining unit configured to obtain an image signal by capturing; a transmission unit configured to transmit, to an external apparatus, information indicating a set capturing condition; a reception unit configured to receive a recovery filter corresponding to a predetermined capturing condition from the external apparatus; and a recovery unit configured to perform recovery processing by applying the recovery filter received by the reception unit to the image signal obtained by the obtaining unit, wherein in a case where, when the obtaining unit obtains an image signal, the reception unit has not received a recovery filter corresponding to a capturing condition set when capturing regarding the image signal was performed, the recovery unit performs recovery processing by applying a spare recovery filter stored in a storage unit.

The present invention in its fifth aspect provides an image capturing apparatus comprising: an obtaining unit configured to obtain an image signal by capturing; a transmission unit configured to transmit, to an external apparatus, information indicating a set capturing condition; a reception unit configured to receive a recovery filter corresponding to the capturing condition from the external apparatus; and a recovery unit configured to perform recovery processing by applying the recovery filter received by the reception unit to the image signal obtained by the obtaining unit, wherein in a case where a recovery filter received by the reception unit does not exist when applying recovery processing, the recovery unit stores the image signal obtained by the obtaining unit without performing recovery processing, and after the reception unit receives a recovery filter, performs recovery processing on the image signal by using the recovery filter.

The present invention in its sixth aspect provides a method of controlling an image capturing system including an image capturing apparatus configured to obtain an image signal by capturing, and an information processing apparatus configured to provide, to the image capturing apparatus, a recovery filter for reducing influence that is included in the image signal and arises from an imaging optical system, comprising: in the image capturing apparatus, a first transmission step of transmitting information indicating a set capturing condition to the information processing apparatus; an obtaining step of obtaining an image signal by capturing; a first reception step of receiving a recovery filter corresponding to a predetermined capturing condition from the information processing apparatus and storing the recovery filter in a storage unit; and a recovery step of performing recovery processing by applying the recovery filter received in the first reception step to the image signal obtained in the obtaining step, and in the information processing apparatus, a second reception step of receiving the information that has been transmitted in the first transmission step and represents the set capturing condition; and a second transmission step of obtaining the recovery filter corresponding to the predetermined capturing condition based on the information indicating the set capturing condition, and transmitting the recovery filter to the image capturing apparatus.

The present invention in its seventh aspect provides a method of controlling an image capturing system including an image capturing apparatus configured to obtain an image signal by capturing, and an information processing apparatus configured to provide, to the image capturing apparatus, a recovery filter for reducing influence that is included in the image signal and arises from an imaging optical system, comprising: in the image capturing apparatus, a first transmission step of transmitting information indicating a capturing condition to the information processing apparatus; an obtaining step of obtaining an image signal by capturing; a first reception step of receiving a recovery filter corresponding to a predetermined capturing condition from the information processing apparatus and storing the recovery filter in a storage unit; and a recovery step of performing recovery processing by applying the recovery filter received in the first reception step to the image signal obtained in the obtaining step, and in the information processing apparatus: a second reception step of receiving the information that has been transmitted in the first transmission step and represents the capturing condition; and a second transmission step of obtaining the recovery filter corresponding to the predetermined capturing condition based on the information indicating the set capturing condition, and transmitting the recovery filter to the image capturing apparatus, wherein in the recovery step, in a case where a recovery filter has not been stored in the storage unit when performing recovery processing, the image signal obtained in the obtaining step is stored without performing recovery processing, and after receiving a recovery filter in the first reception step, recovery processing is performed on the image signal by using the recovery filter.

The present invention in its eighth aspect provides a method of controlling an image capturing apparatus, comprising: an obtaining step of obtaining an image signal by capturing; a prediction step of predicting a capturing condition set at the time of capturing based on information indicating a set capturing condition; a transmission step of transmitting, to an external apparatus, information indicating a capturing condition predicted in the prediction step; a reception step of receiving a recovery filter corresponding to the predicted capturing condition from the external apparatus; and a recovery step of performing recovery processing by applying the recovery filter received in the reception step to the image signal obtained in the obtaining step.

The present invention in its ninth aspect provides a method of controlling an image capturing apparatus, comprising: an obtaining step of obtaining an image signal by capturing; a transmission step of transmitting, to an external apparatus, information indicating a set capturing condition; a reception step of receiving a recovery filter corresponding to a predetermined capturing condition from the external apparatus; and a recovery step of performing recovery processing by applying the recovery filter received in the reception step to the image signal obtained in the obtaining step, wherein in the recovery step, in a case where, when an image signal is obtained in the obtaining step, a recovery filter corresponding to a capturing condition set when capturing regarding the image signal was performed has not been received in the reception step, recovery processing is performed by applying a spare recovery filter stored in a storage unit.

The present invention in its tenth aspect provides a method of controlling an image capturing apparatus, comprising: an obtaining step of obtaining an image signal by capturing; a transmission step of transmitting, to an external apparatus, information indicating a set capturing condition; a reception step of receiving a recovery filter corresponding to the capturing condition from the external apparatus; and a recovery step of performing recovery processing by applying the recovery filter received in the reception step to the image signal obtained in the obtaining step, wherein in the recovery step, in a case where a recovery filter received in the reception step does not exist when applying recovery processing, the image signal obtained in the obtaining step is stored without performing recovery processing, and after a recovery filter is received in the reception step, recovery processing is performed on the image signal by using the recovery filter.

Further features of the present invention will become apparent from the following description of exemplary embodiments (with reference to the attached drawings).

DESCRIPTION OF THE EMBODIMENTS

Embodiment

An exemplary embodiment of the present invention will now be described in detail with reference to the accompanying drawings. Note that the embodiment set forth below will explain an example of applying the present invention to a system constituted by a digital camera capable of executing recovery processing as an example of an image capturing apparatus, and a server capable of transmitting a recovery filter as an example of an information processing apparatus. However, the present invention is applicable to a system constituted by an arbitrary device that has an image capturing function and can execute recovery processing, and one or more external apparatuses including an arbitrary device capable of transmitting a recovery filter necessary for the recovery processing to the device.

<<Arrangement of Image Capturing System>>

Figure 1:
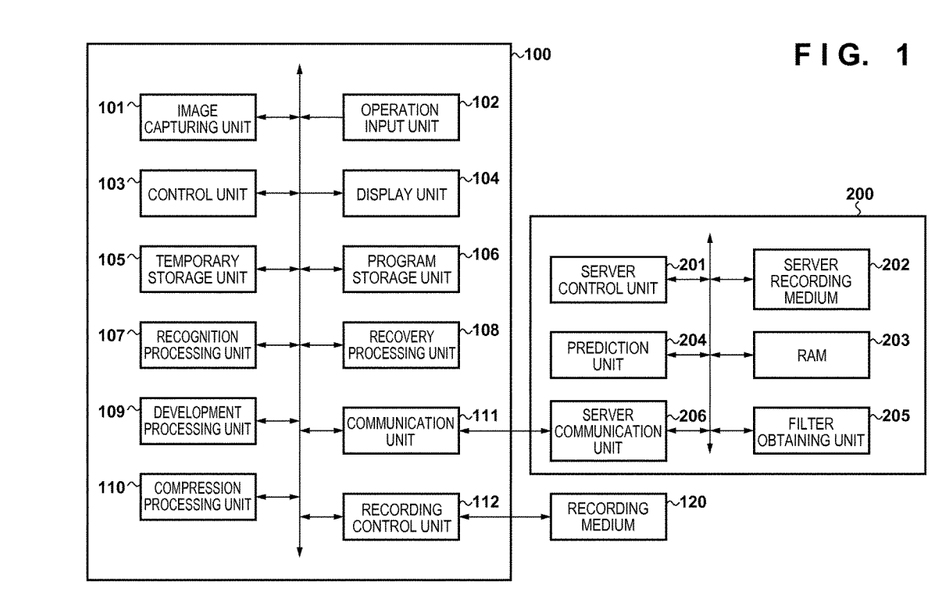
FIG. 1 is a block diagram showing the functional arrangements of respective apparatuses constituting an image capturing system according to an embodiment of the present invention.

FIG. 1 is a block diagram showing the functional arrangement of an image capturing system constituted by a digital camera 100 and a server 200 according to the embodiment of the present invention.

A control unit 103 is, for example, a CPU or a microcomputer. The control unit 103 reads out the operation programs of the respective blocks of the digital camera 100 that are stored in a program storage unit 106, extracts the operation programs into a temporary storage unit 105, and executes them to control the operations of the respective blocks.

The program storage unit 106 is, for example, an electrically rewritable nonvolatile memory. The program storage unit 106 stores not only the operation programs of the respective blocks of the digital camera 100, but also parameters and the like necessary in the operations of the respective blocks. In this embodiment, the program storage unit 106 stores spare recovery filters (simple filters) used when no preferable recovery filter could be received from the server 200.

The temporary storage unit 105 is, for example, a volatile memory such as a DRAM. The temporary storage unit 105 is used not only as an extraction area for the operation programs of the respective blocks of the digital camera 100, but also a storage area for temporarily storing intermediate data and the like, output in the operations of the respective blocks. In this embodiment, the temporary storage unit 105 is used as a storage area for storing a recovery filter transmitted from the server 200.

Figure 3A:
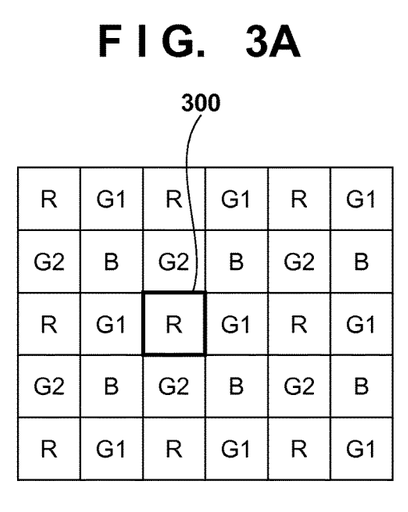
FIGS. 3A and 3B are other views for explaining recovery processing according to the embodiment of the present invention.

An image capturing unit 101 includes an imaging optical system including a plurality of lenses, an actuator for adjusting a lens position, and an aperture and shutter for adjusting the amount of light entering the imaging optical system through a lens. The image capturing unit 101 also includes an image sensor such as a CCD or CMOS sensor that photoelectrically converts an optical image formed by the imaging optical system, and an A/D conversion unit that converts an analog image signal obtained by the image sensor into image data. In the image sensor according to this embodiment, color filters of the Bayer array as shown in FIG. 3A are applied to respective pixels. Image data obtained by the image capturing unit 101 are so-called RAW data that are image signals of the Bayer array.

An operation input unit 102 is the user interface of the digital camera 100, including, for example, a power button, a shutter button, and buttons used to change capturing conditions such as the capturing mode, focal distance, shutter speed, aperture state, exposure amount, and sensitivity setting. When the operation input unit 102 detects that the user have performed operation inputs to these user interfaces, it outputs control signals corresponding to the operation inputs to the control unit 103.

Note that the digital camera 100 according to this embodiment has, as capturing modes, a scene selection mode, auto mode, program AE mode, aperture priority mode, shutter speed priority mode, and manual mode. The scene selection mode is a mode in which capturing conditions prepared in advance are set in correspondence with a capturing scene selected by the user, such as a person or landscape. The auto mode is a mode in which a capturing scene is recognized and all capturing conditions are set automatically. The program AE mode is a mode in which a combination of the aperture and shutter speed is automatically set and the user can make other settings (for example, sensor sensitivity, exposure setting, and auto focus operation mode). The aperture priority mode is a mode in which the shutter speed is automatically set in accordance with an aperture value set by the user. The shutter speed priority mode is a mode in which the aperture value is automatically set in accordance with a shutter speed set by the user. The manual mode is a mode in which the user can set all capturing conditions such as the aperture value and shutter speed. The respective capturing modes can be switched by performing an operation input to a dial button by the user after power-on of the digital camera 100.

A display unit 104 is the display device of the digital camera 100 such as an LCD. The display unit 104 displays image data obtained by image capturing, image data read out from a recording medium 120 (to be described later), a menu screen regarding the settings of capturing conditions, and the like.

A recognition processing unit 107 performs processing of specifying a capturing scene by using image data obtained by image capturing. In this embodiment, the recognition processing unit 107 specifies, based on image data, one of four types of capturing scenes: a portrait capturing scene, landscape capturing scene, macro capturing scene, and moving object capturing scene.

A recovery processing unit 108 executes recovery processing of correcting the influence of degradation of the image quality caused by the optical aberration and diffraction phenomenon of the imaging optical system on RAW data obtained by capturing in response to an operation to the shutter button. More specifically, the recovery processing unit 108 performs recovery processing by applying, to RAW data, a predetermined recovery filter corresponding to capturing conditions set when the data was obtained by capturing.

A development processing unit 109 performs so-called development processing by applying, to RAW data after recovery processing, various image processes such as noise reduction processing, sharpness processing, gamma processing, and YUV conversion. A compression processing unit 110 applies compression processing of a predetermined encoding format to image data after development processing, and converts the image data into image data (to be referred to as JPEG data hereinafter) for recording.

A communication unit 111 is the communication interface of the digital camera 100. The communication unit 111 connects the digital camera 100 to the server 200 by a predetermined communication scheme, and performs data transmission/reception. In this embodiment, the communication unit 111 transmits, to the server 200, information indicating currently set capturing conditions, and receives a recovery filter from the server 200.

A recording control unit 112 controls write of data on the recording medium 120 or readout of data recorded on the recording medium 120. The recording medium 120 is, for example, a recording medium detachably connected to the digital camera 100, such as a memory card or HDD. When capturing is performed, the recording control unit 112 records RAW data before and after recovery processing and JPEG data after compression processing on the recording medium 120.

A server control unit 201 is, for example, a CPU. The server control unit 201 controls the operations of the respective blocks by reading out the operation programs of the respective blocks of the server 200 that are recorded on a server recording medium 202, extracting the operation programs to a RAM 203, and executing them.

The server recording medium 202 is, for example, a recording device such as an HDD. The server recording medium 202 records not only the operation programs of the respective blocks of the server 200, but also parameters and the like necessary in the operations of the respective blocks. In this embodiment, the server recording medium 202 also records the history of capturing conditions regarding capturing performed in the digital camera 100, information necessary to generate a recovery filter, data of a generated recovery filter, and the like.

The RAM 203 is, for example, a volatile memory such as a DRAM. The RAM 203 provides an extraction area for the operation programs of the respective blocks of the server 200, and also stores intermediate data and the like output in the operations of the respective blocks.

Based on information of capturing conditions that have been received from the digital camera 100 and are currently set in the digital camera 100, a prediction unit 204 predicts capturing conditions in capturing to be performed in the digital camera 100 after the time of reception. In this embodiment, the prediction unit 204 predicts the capturing conditions of capturing to be performed, based on obtained capturing conditions and history information of capturing conditions.

A filter obtaining unit 205 generates a recovery filter corresponding to capturing conditions predicted by the prediction unit 204, or obtains a corresponding recovery filter recorded on the server recording medium 202.

A server communication unit 206 is the communication interface of the server 200. The server communication unit 206 connects the server 200 to the digital camera 100 by a predetermined communication scheme, and performs data transmission/reception. In this embodiment, the server communication unit 206 transmits a recovery filter to the digital camera 100, and receives information indicating capturing conditions from the digital camera 100.

Note that this embodiment will explain that processes are implemented in the respective blocks of the digital camera 100 and server 200 serving as hardware components, but the implementation of the present invention is not limited to this. The processes of the respective blocks may be implemented by programs that perform the same processes as those of the respective blocks.

<<Outline of Recovery Processing>>

An outline of recovery processing to be performed by the recovery processing unit 108 of the digital camera 100 according to this embodiment will be explained with reference to the drawings.

Figure 2A:
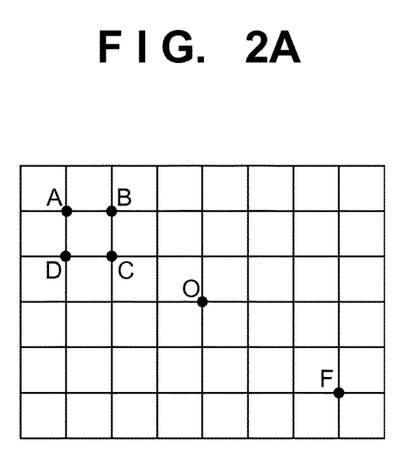
FIGS. 2A and 2B are views for explaining recovery processing according to the embodiment of the present invention.

RAW data input to the recovery processing unit 108 is divided into a plurality of blocks, as shown in FIG. 2A, and recovery processing is executed for each block. The magnitude of the influence on an image by aberration or diffraction arising from the imaging optical system changes depending on the image height and argument centered on an optical center O shown in FIG. 2A. Hence, differences in image height and argument need to be considered in recovery processing of a pixel in a block indicated by lattice points A, B, C, and D in FIG. 2A. The recovery processing unit 108 calculates a pixel value $E_T$ of a pixel T of interest in this block after recovery processing by performing weighted addition of pixel values $E_A$, $E_B$, $E_C$, and $E_D$ after applying a recovery filter to each of the lattice points A, B, C, and D. More specifically, the pixel value $E_T$ of the pixel T of interest spaced apart by s from the lattice point A in the horizontal direction (right direction in FIG. 2A), and t in the vertical direction (down direction in FIG. 2A) is calculated as:

$$E_T=(1-t)\times\{(1-s)\times E_A+s\times E_B\}+t\times\{s\times E_C+(1-s)\times E_D\}$$

Note that the influence on an image by aberration or diffraction generally appears as four-fold symmetry (rotational symmetry), so it suffices to obtain a recovery filter for only one quadrant. That is, a recovery filter applied to a lattice point F in FIG. 2A may be one obtained by vertically and horizontally reversing a recovery filter applied to the lattice point A.

Figure 3B:
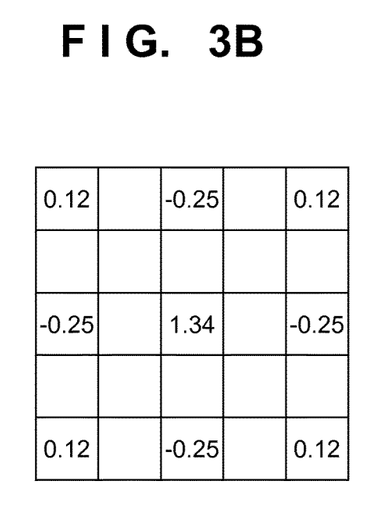

The influence on an image by aberration or diffraction also changes depending on the wavelength of incident light. As described above, filters of the Bayer array as shown in FIG. 3A are applied to the image sensor in the image capturing unit 101 according to this embodiment. Hence, recovery processing of the pixel T of interest includes processing of multiplying surrounding pixel signals of the same color by coefficients and performing convolution integral. For example, for a pixel 300 of the R component shown in FIG. 3A, eight surrounding pixels of the same R component as that of the pixel 300 are multiplied by coefficients as shown in FIG. 3B. Since a plurality of pixels are referred to in recovery processing of one pixel of interest, the recovery filter is constituted as a two-dimensional filter for each lattice point. In the example of FIG. 3B, 5×5 pixels around the pixel of interest are referred to, so the recovery filter has 5×5 taps. In order to simply describe the number of taps of the recovery filter, an N×N-tap recovery filter will be simply referred to as an N-tap recovery filter hereinafter.

Figure 2B:
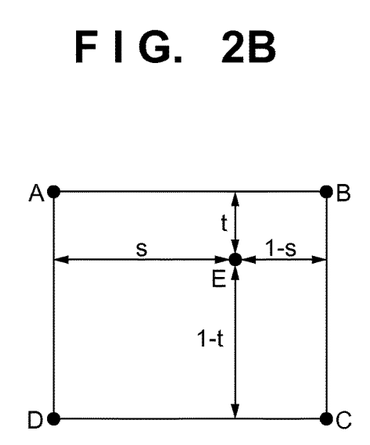

The effect and accuracy of recovery processing change depending on the number of taps of the recovery filter and the number of lattice points (number of points) of block division. When the number of taps of the recovery filter is large, recovery processing of a pixel of interest is performed by referring to pixels of a wider range, the recovery effect on the contrast in the low frequency against a wide blur such as coma or the diffraction phenomenon becomes large. The number of taps necessary to obtain the recovery effect depends on the pixel pitch in the image sensor. For example, when the pixel pitch is about 4 μm, the image quality can be improved to a certain degree in the entire image region even by a several ten-tap recovery filter. However, to obtain a satisfactory image quality improvement effect against a widely blurring aberration around the image, a several hundred-tap recovery filter is necessary. When the number of points of the recovery filter is large, the accuracy of recovery processing is improved because the distances between the lattice points A, B, C, and D and the pixel T of interest recovered by an appropriate recovery filter become short, as shown in FIG. 2B. That is, when the number of points is small, the accuracy of recovery processing decreases as the pixel position comes close to the center of the block.

As described above, the influence on an image by aberration or diffraction also changes depending on capturing conditions (aperture value, focal distance, and subject distance) set when an image was captured. That is, the recovery filter capable of preferably reducing the influence changes depending on a combination of capturing conditions. However, it is not practical to hold recovery filters in the digital camera 100 for all combinations of capturing conditions. More specifically, a recovery filter for obtaining a preferable recovery effect with high accuracy corresponds to capturing conditions and requires a scale of several ten taps. When recovery filters corresponding to all conditions are prepared for one imaging optical system, the data amount may become several thousand MB. When a plurality of types of recovery filters are extracted into the temporary storage unit 105 so as to be able to use them quickly in recording processing, they may occupy a work area necessary for other image processes. In this embodiment, therefore, the server 200 holds or generates recovery filters matching an imaging optical system and capturing conditions, and provides the recovery filters to the digital camera 100. If the server 200 provides a recovery filter suited to a captured image in this manner, the digital camera 100 can preferably perform recovery processing of the captured image.

To perform recovery processing at the time of recording a captured image without requiring a user operation, as described above, a recovery filter needs to be obtained prior to processing regarding recording. Based on the imaging optical system of the digital camera 100 that has been obtained before capturing, and information of capturing conditions set at that time, the prediction unit 204 according to this embodiment predicts the imaging optical system and information of capturing conditions at the time when capturing is assumed to be performed. A recovery filter decided based on this prediction is provided to the digital camera 100.

However, for example, when capturing conditions suddenly change, no preferable recovery result may be obtained by the recovery filter decided based on this prediction. Depending on the communication situation of the digital camera 100 and server 200, no recovery filter may have been received at the timing of recording processing. In the digital camera 100 according to this embodiment, the program storage unit 106 holds spare recovery filters (simple filters) used when a recovery filter regarding preferable conditions was not provided from the server 200 or could not have been received. The simple filter is a filter smaller in the number of taps than recovery filters that are prepared in advance for several combinations of capturing conditions for each imaging optical system and are received from the server 200. More specifically, a spare filter is constituted by arranging a predetermined number of set points for the respective parameters of capturing conditions. When no recovery filter is obtained from the server 200, the recovery processing unit 108 approximately uses a spare filter close in conditions. Depending on the number and distribution of set points, the effect and accuracy of recovery processing using a spare filter change. By adopting spare filters in which the number of taps is restricted, the data amount can be suppressed to about several MB though the recovery effect is restricted. If imaging optical systems to which recovery processing is applicable are limited, such spare filters can be held in advance in the program storage unit 106. Even when no preferable recovery filter could have been obtained from the server 200, recovery processing is applicable.

Figure 4:
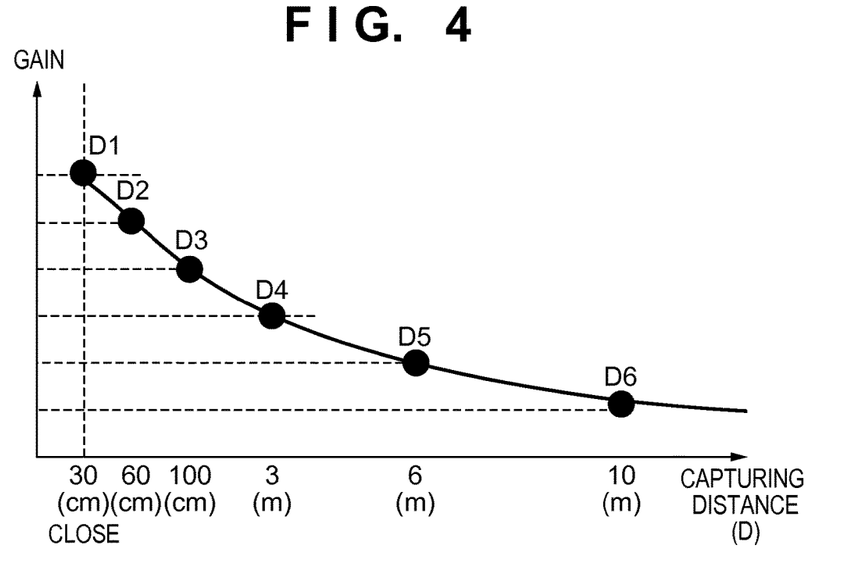
FIG. 4 is a graph exemplifying a change of a recovery filter upon a change of a capturing condition according to the embodiment of the present invention.

FIG. 4 shows the gain (effect) of a recovery filter that is preferable in accordance with the subject distance when the aperture value and the focal distance among capturing conditions are fixed to predetermined values. When the subject distance is a close distance (30 cm), the degree of influence on an image by aberration is large, and the gain of the preferable recovery filter becomes large in FIG. 4. As the subject distance increases, the degree of influence by aberration decreases and the gain of the recovery filter also decreases. For example, when a spare filter is generated by setting set points D1 to D6 in correspondence with subject distances (30 cm, 60 cm, 100 cm, 3 m, 6 m, and 10 m), as indicated by filled circles in FIG. 4, any gain is used in recovery processing in accordance with the subject distance.

Figure 5:
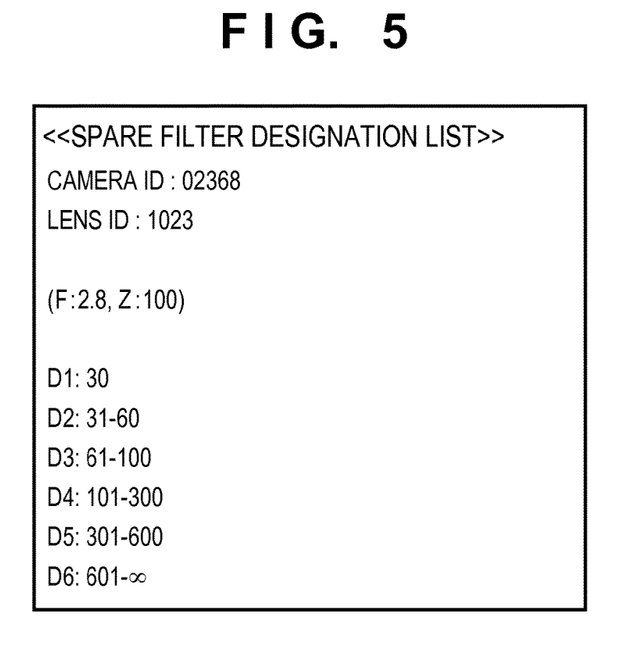
FIG. 5 is a view exemplifying a spare filter designation list according to the embodiment of the present invention.

However, when a spare filter suited to each discretely set condition is used, if the gain of a set point closest to an actual capturing condition is used, a gain larger than a preferable gain is applied and over-recovery or the like may occur. Thus, the recovery processing unit 108 according to this embodiment prepares a spare filter designation list representing a spare filter regarding a set point that should be applied in accordance with actual capturing conditions, as shown in FIG. 5, and decides a spare filter by referring to the list. The spare filter designation list is created based on the design value of the optical system so as to use a spare filter for a set point at which the gain becomes smaller than a gain suited to actual capturing conditions in order to avoid over-recovery. With this list, recovery processing can be performed without causing over-recovery even when a spare filter set for the set point of a limited capturing condition is used.

<<Capturing Processing>>

Figure 6:
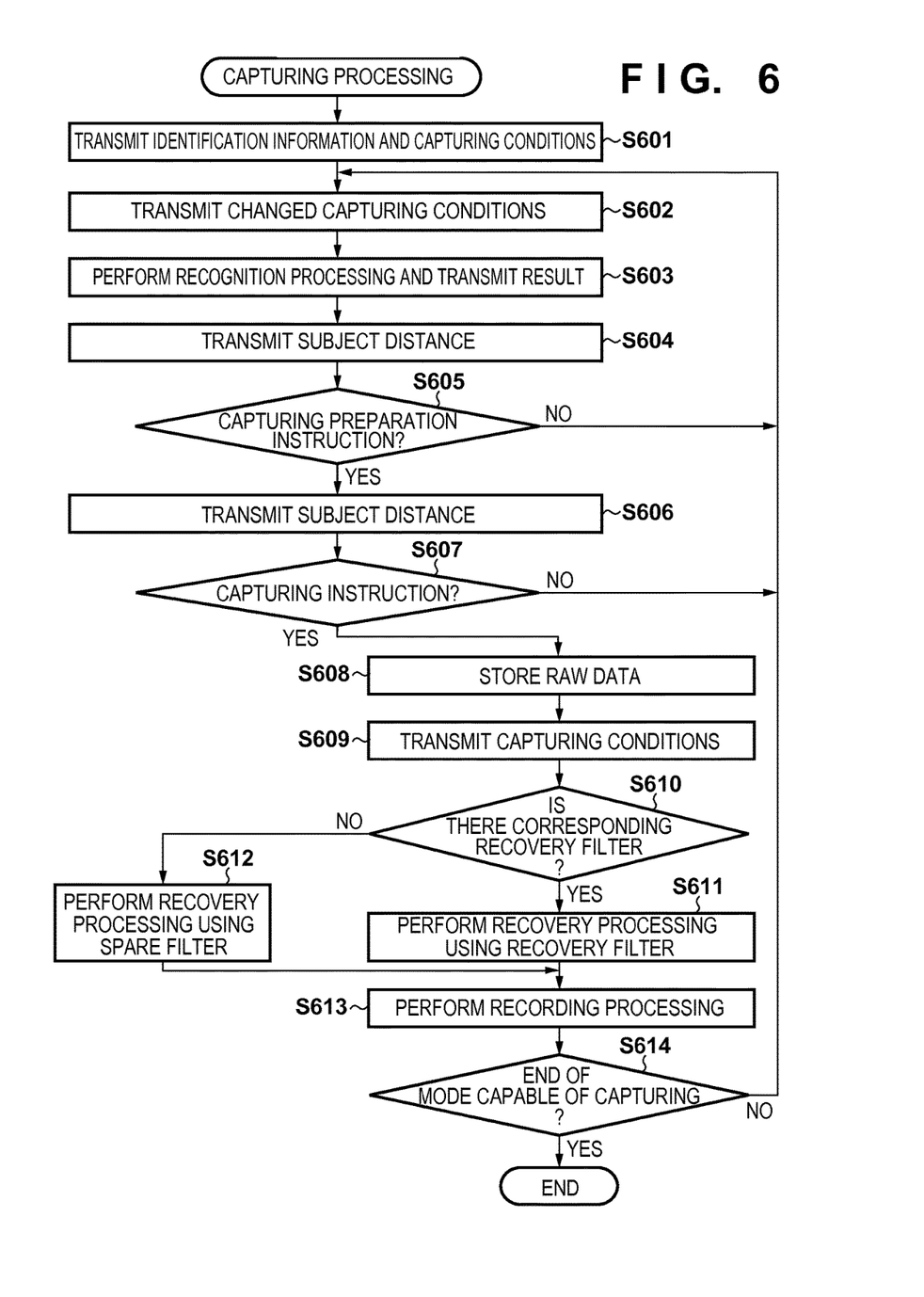
FIG. 6 is a flowchart exemplifying capturing processing to be executed in a digital camera 100 according to the embodiment of the present invention.

Detailed processing will be explained with reference to the flowchart of FIG. 6 for capturing processing to be executed in the digital camera 100 having this arrangement according to this embodiment. Processing corresponding to this flowchart can be implemented when the control unit 103 reads out a corresponding processing program stored in, for example, the program storage unit 106, extracts it into the temporary storage unit 105, and executes it. This capturing processing will be explained to start when, for example, the digital camera 100 is set to a mode capable of capturing.

Assume that, when the communication unit 111 receives a recovery filter from the server 200 during execution of this capturing processing, the control unit 103 stores the received recovery filter in the temporary storage unit 105. That is, this capturing processing performs processing of transmitting information necessary to receive a recovery filter, but progresses independently of reception of a recovery filter. Assume that storage of a received recovery filter is performed by reception processing (not shown).

In step S601, the control unit 103 transmits, to the communication unit 111, various kinds of identification information and information of capturing conditions regarding the current settings of the digital camera 100, and controls the communication unit 111 to transmit them to the server 200. Various kinds of identification information are pieces of information for specifying the digital camera 100 and a mounted imaging optical system, and include a user ID for identifying the user of the digital camera 100, a camera ID for specifying a device, and a lens ID for specifying an imaging optical system. This embodiment will explain that information of the capturing mode, aperture value, and focal distance is transmitted as information of capturing conditions regarding the settings of the digital camera 100. However, the information regarding capturing conditions may be information of another setting such as the sensor sensitivity.

In step S602, if the control unit 103 determines that capturing conditions regarding the settings of the digital camera 100 have been changed, it transmits information of the changed capturing conditions to the communication unit 111, and controls the communication unit 111 to transmit the information to the server 200.

In step S603, if the control unit 103 determines that it is set to perform recognition of a capturing scene, the control unit 103 controls the recognition processing unit 107 to execute recognition processing of a capturing scene. More specifically, the recognition processing unit 107 analyzes image data output from the image capturing unit 101 and performs recognition processing of a capturing scene. Upon completion of recognition processing by the recognition processing unit 107, the control unit 103 transmits information of the recognition result to the communication unit 111, and controls the communication unit 111 to transmit the information to the server 200. In step S604, the control unit 103 transmits, to the communication unit 111, a measurement result obtained by measuring a subject distance, and controls the communication unit 111 to transmit the measurement result to the server 200.

This embodiment will explain that information of a capturing scene obtained as a result of recognition processing, and a measured subject distance are transmitted to the server 200 as some capturing conditions. However, the implementation of the present invention is not limited to this. For example, when a capturing mode selected by the user is a mode assuming a specific subject distance, such as a close-up mode, information of a subject distance corresponding to the mode may be transmitted without performing measurement. For example, even when no subject distance is assumed in accordance with a capturing scene, but when the capturing mode is an aperture value priority mode and the aperture value is large (aperture diameter is small), the subject distance may be set to infinity on the assumption that the subject is a landscape. Alternatively, even if it is not set to perform recognition of a capturing scene, information indicating that the capturing scene is a landscape capturing scene may be transmitted. Also, for example, when the AF operation mode setting is a subject tracking mode, it may be determined that the subject is a moving object, and information indicating a moving object capturing scene may be transmitted.

This embodiment explains that a capturing scene is specified in the digital camera 100 and transmitted. However, it is also possible to transmit the above-described information necessary to specify a capturing scene, and specify a capturing scene by the prediction unit 204.

In step S605, the control unit 103 determines whether a capturing preparation instruction has been issued. More specifically, the control unit 103 makes the determination in this step based on whether a control signal regarding a so-called SW1 signal has been received from the operation input unit 102. If the control unit 103 determines that a capturing preparation instruction has been issued, it shifts the process to step S606. If the control unit 103 determines that no capturing preparation instruction has been issued, it returns the process to step S602.

In step S606, the control unit 103 transmits, to the communication unit 111, information of a subject distance newly obtained for AF control, and controls the communication unit 111 to transmit the information to the server 200.

In step S607, the control unit 103 determines whether a capturing instruction has been issued. More specifically, the control unit 103 makes the determination in this step based on whether a control signal regarding a so-called SW2 signal has been received from the operation input unit 102. If the control unit 103 determines that a capturing instruction has been issued, it shifts the process to step S608. If the control unit 103 determines that no capturing instruction has been issued, it returns the process to step S602.

In step S608, the control unit 103 stores, in the temporary storage unit 105, RAW data output from the image capturing unit 101. In step S609, the control unit 103 transmits, to the communication unit 111, information of capturing conditions regarding the settings of the digital camera 100 when the capturing instruction has been issued, and controls the communication unit 111 to transmit the information to the server 200.

In step S610, when performing recovery processing of RAW data obtained by capturing, the recovery processing unit 108 determines whether a recovery filter corresponding to capturing conditions at the time of capturing has been stored in the temporary storage unit 105. The determination in this step is made by referring to, for example, information of capturing conditions included in the header of a recovery filter, and determining whether the stored recovery filter matches the capturing conditions at the time of capturing. If the recovery processing unit 108 determines that a recovery filter corresponding to capturing conditions at the time of capturing has been stored, it shifts the process to step S611. If the recovery processing unit 108 determines that such a recovery filter has not been stored, it shifts the process to step S612.

In step S611, the recovery processing unit 108 reads out the recovery filter that has been stored in the temporary storage unit 105 and corresponds to the capturing conditions at the time of capturing, and performs recovery processing of RAW data. If the recovery processing unit 108 determines in step S610 that no corresponding recovery filter has been stored, it refers to the spare filter designation list in step S612, and specifies a spare filter corresponding to the capturing conditions at the time of capturing. Then, the recovery processing unit 108 reads out the specified spare filter from the program storage unit 106, and performs recovery processing of RAW data.

In step S613, the control unit 103 applies, to the RAW data after recovery processing, processes regarding recording such as development processing by the development processing unit 109 and compression processing by the compression processing unit 110. The control unit 103 transmits the obtained JPEG data to the recording control unit 112, and controls the recording control unit 112 to record the JPEG data on the recording medium 120.

In step S614, the control unit 103 determines whether the mode capable of capturing has been ended. Whether the mode capable of capturing has been ended is determined based on whether a mode in which capturing is not performed, such as a playback mode, has been set, or whether an instruction regarding power-off of the digital camera 100 has been input. If the control unit 103 determines that the mode capable of capturing has been ended, it completes the capturing processing. If the control unit 103 determines that the mode capable of capturing has not been ended, it returns the process to step S602.

<<Filter Transmission Processing>>

Figure 7:
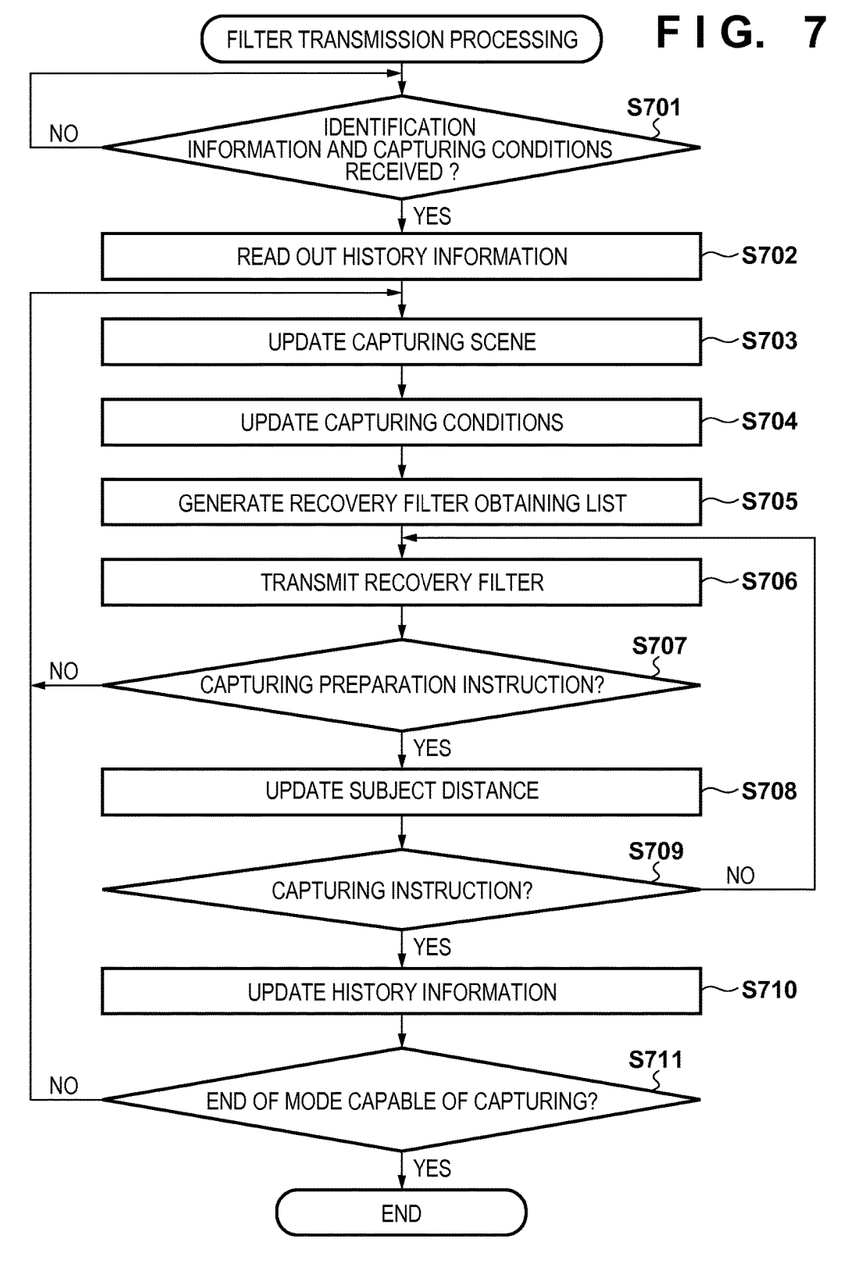
FIG. 7 is a flowchart exemplifying filter transmission processing to be executed in a server 200 according to the embodiment of the present invention.

Next, filter transmission processing to be performed in the server 200 according to this embodiment will be explained in detail with reference to the flowchart of FIG. 7. Processing corresponding to this flowchart can be implemented when the server control unit 201 reads out a corresponding processing program stored in, for example, the server recording medium 202, extracts it into the RAM 203, and executes it. This capturing processing will be explained to start upon, for example, receiving a signal representing that the digital camera 100 has been set in a mode capable of capturing.

In step S701, the server control unit 201 determines whether various kinds of identification information and information of currently set capturing conditions have been received from the digital camera 100. If the server control unit 201 determines that various kinds of identification information and information of currently set capturing conditions have been received, it stores these pieces of information in the RAM 203 and shifts the process to step S702. If the server control unit 201 determines that various kinds of identification information and information of currently set capturing conditions have not been received, it repeats the processing of this step.

Figure 8:
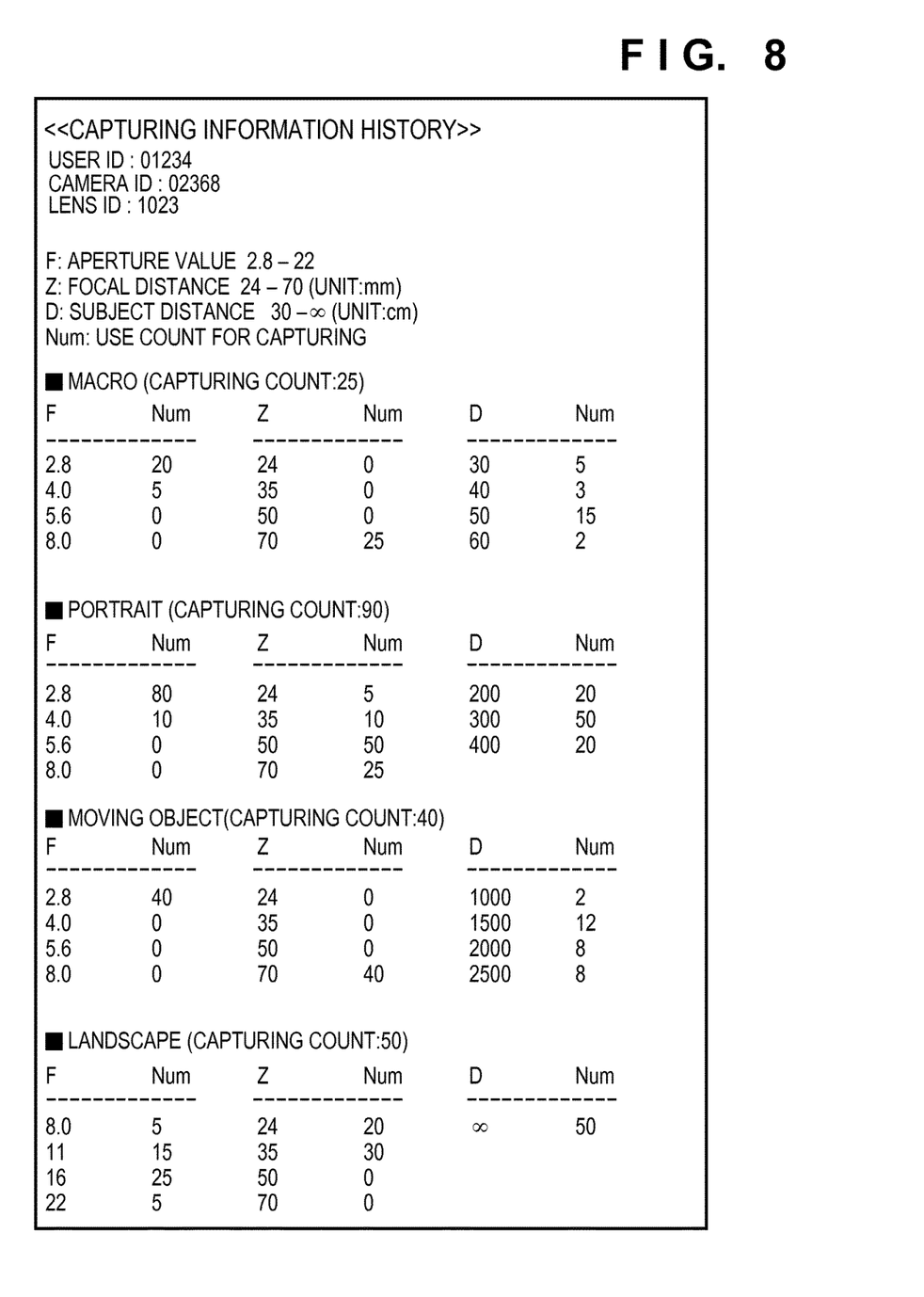
FIG. 8 is a view exemplifying history information of capturing conditions according to the embodiment of the present invention.

In step S702, the server control unit 201 reads out, from the server recording medium 202 based on various kinds of identification information, history information of capturing conditions regarding capturing performed in the corresponding digital camera 100, and extracts the history information into the RAM 203. The history information of capturing conditions is information obtained by totaling, for each capturing scene, the use count of capturing conditions (aperture value, focal distance, and subject distance) at the time of capturing performed in the past by the same digital camera 100, as shown in FIG. 8.

In step S703, if the server control unit 201 determines that information of the recognition result of a capturing scene different from information of a capturing scene stored in the RAM 203 has been received, it updates the information of the capturing scene in the RAM 203.

In step S704, if the server control unit 201 determines that information of new capturing conditions (capturing conditions regarding the settings of the digital camera 100, and a subject distance) has been received, it updates the information of capturing conditions in the RAM 203 based on the received information.

Figure 9:
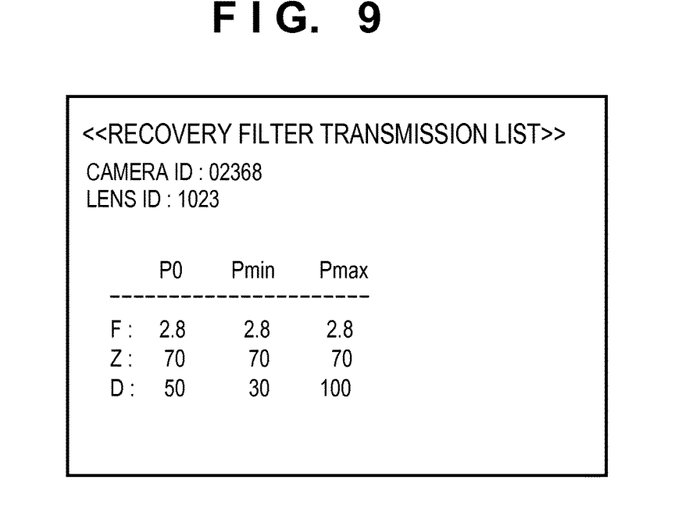
FIG. 9 is a view exemplifying a recovery filter transmission list according to the embodiment of the present invention.

In step S705, the prediction unit 204 estimates capturing conditions at the time of capturing based on the information of capturing conditions and the history information of capturing conditions that are currently stored in the RAM 203. The prediction unit 204 then generates a recovery filter transmission list as shown in FIG. 9, and stores it in the RAM 203. In FIG. 9, F, Z, and D represent the aperture value, focal distance, and subject distance, respectively. P0 represents the capturing conditions of a recovery filter which should be transmitted with top priority. Pmin and Pmax represent the range of capturing conditions regarding recovery filters obtained for transmission.

<Recovery Filter Transmission List Generation Method>

A recovery filter transmission list generation method will be explained here.

Figure 10:
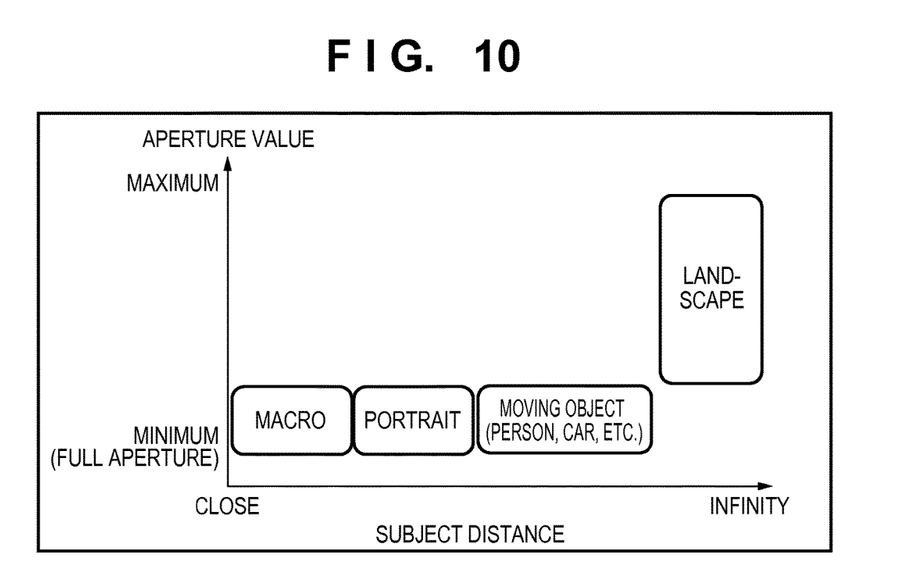
FIG. 10 is a view exemplifying the range of capturing conditions selected for each capturing scene according to the embodiment of the present invention.

In this embodiment, a recovery filter is decided for use in recovery processing based on a combination of the aperture value, focal distance, and subject distance serving as capturing conditions, so there are several patterns. In actual, however, capturing conditions used in capturing are limited to a specific range in accordance with a capturing scene as shown in FIG. 10. That is, the load on data transfer can be reduced by creating a recovery filter transmission list so as to preferentially transmit, to the digital camera 100, a recovery filter corresponding to capturing conditions in a range suited to each capturing scene. In the recovery filter transmission list generated in this embodiment, capturing conditions frequently used by the user of the digital camera 100 are set as the top priority conditions P0 based on history information of capturing conditions. Accordingly, capturing conditions usable at the time of capturing can be preferably predicted even in a capturing mode complying with the user taste, such as the aperture value priority mode. This increases the possibility at which appropriate recovery processing can be executed on RAW data.

For example, when the capturing scene is the macro capturing scene, the recovery filter transmission list is configured to preferentially transmit a recovery filter regarding capturing conditions in which the capturing distance is from the minimum capturing distance of the lens to 1 m in the full-aperture state. As the top priority conditions P0, capturing conditions with a highest use frequency are selected by referring to history information of capturing conditions, as shown in FIG. 8. In the example of FIG. 8, F: 2.8, Z: 70 cm, and D: 50 cm. When the sampling number (capturing count) of history information of capturing conditions is small, the use frequency of each capturing condition may not satisfactorily reflect the user taste. In this case, an intermediate value (65 cm in this case) between the parameters Pmin and Pmax representing the obtaining range may be used instead. When capturing conditions outside the range defined by Pmin and Pmax are used a predetermined number of times or more in history information of capturing conditions, the list may be updated by reflecting the history.

When the capturing scene is the portrait capturing scene in the example of FIG. 8, the list is configured to preferentially transmit a recovery filter corresponding to a subject distance of 1 m to 10 m in the full-aperture state. When the capturing scene is the landscape capturing scene, the list is configured to preferentially transmit a recovery filter corresponding to a subject distance ∞ and an aperture value of F8 or more (aperture diameter is equal to or smaller than a predetermined value). When the capturing scene is the moving object capturing scene, the subject distance of a moving object at the time of capturing to be performed later may be estimated based on the transition of the subject distance received in step S707 of filter transmission processing to be described later, and the recovery filter transmission list may be configured based on the estimation.

In step S706, the filter obtaining unit 205 refers to the recovery filter transmission list stored in the RAM 203, and reads out, from the server recording medium 202, recovery filters that have not been transmitted to the digital camera 100 yet and correspond to the capturing conditions in the list. Then, the filter obtaining unit 205 sequentially transmits the recovery filters to the server communication unit 206, and controls the server communication unit 206 to transmit them to the digital camera 100.

In the example of FIG. 9, recovery filters corresponding to subject distances ranging from 30 cm to 100 cm with the aperture value fixed to 2.8 and the focal distance fixed to 70 mm are transmitted. This embodiment assumes that recovery filters are recorded on the server recording medium 202 for discretely set capturing conditions so as not to influence the accuracy of recovery processing with respect to a combination of the aperture value, focal distance, and subject distance. For example, when recovery filters with the conditions of subject distances of 30, 35, 40, 50, 70, and 100 (unit: cm) are recorded on the server recording medium 202, a total of six patterns of recovery filters are obtained and transmitted to the digital camera 100. As the order in which recovery filters are transmitted, a filter corresponding to the capturing conditions P0 is set at the top in the priority order, and filters corresponding to capturing conditions close to P0 are sequentially transmitted. In the example of FIG. 9, corresponding recovery filters are transmitted to the digital camera 100 in the order of the subject distances of 50, 70, 40, 100, 35, and 30.

This embodiment will explain that recovery filters are record on the server recording medium 202 for predetermined combinations of capturing conditions, and the filter obtaining unit 205 obtains and transmits a recovery filter based on the recovery filter transmission list. However, the recovery filters need not be recorded on the server recording medium 202 in the implementation of the present invention. For example, when a recovery filter corresponding to desired capturing conditions does not exist on the server recording medium 202, the filter obtaining unit 205 may generate a matching recovery filter. In this case, for example, information of the OTF coefficient of the imaging optical system is recorded on the server recording medium 202. The filter obtaining unit 205 suffices to generate a recovery filter based on this information and information of a parameter change depending on capturing conditions.

In step S707, the server control unit 201 determines whether a capturing preparation instruction has been issued in the digital camera 100. More specifically, the server control unit 201 makes the determination in this step based on whether information of a subject distance transmitted in accordance with a capturing preparation instruction from the digital camera 100 has been received. If the server control unit 201 determines that a capturing preparation instruction has been issued, it updates corresponding information stored in the RAM 203 by the information of the subject distance received in step S708. If the server control unit 201 determines that no capturing preparation instruction has been issued, it returns the process to step S703.

In step S709, the server control unit 201 determines whether a capturing instruction has been issued in the digital camera 100. More specifically, the server control unit 201 makes the determination in this step based on whether information of capturing conditions at the time of capturing that have been transmitted in accordance with a capturing instruction from the digital camera 100 has been received. If the server control unit 201 determines that a capturing instruction has been issued, it adds the capturing conditions of newly performed capturing to the history information of capturing conditions stored in the RAM 203, records them on the server recording medium 202, and updates the history information in step S710. If the server control unit 201 determines that no capturing instruction has been issued, it returns the process to step S705.

In step S711, the server control unit 201 determines whether a signal representing that the mode capable of capturing has been ended in the digital camera 100 has been received. If the server control unit 201 determines that a signal representing that the mode capable of capturing has been ended has been received, it completes the filter transmission processing. If the server control unit 201 determines that a signal representing that the mode capable of capturing has been ended has not been received, it returns the process to step S703.

With this setting, the prediction unit 204 can predict capturing conditions at the time of capturing based on information of capturing conditions set before capturing, and transmit a recovery filter. Even if capturing was performed under capturing conditions different from the predicted ones, or reception of a recovery filter fails, recovery processing can be performed because the digital camera 100 according to this embodiment includes a spare filter smaller in data amount than a recovery filter received from the server 200.

Note that this embodiment has exemplified the arrangement in which the digital camera 100 receives a recovery filter from the server 200. However, the present invention is not limited to this. For example, in a digital camera system constituted by a detachable interchangeable lens and a camera body, the interchangeable lens may store an OTF coefficient unique to the interchangeable lens and generate a recovery filter in accordance with transmitted capturing conditions. Further, the interchangeable lens may include the prediction unit 204 and predict, based on capturing conditions transmitted from the digital camera and the history information, capturing conditions at the time when capturing is assumed to be performed. Alternatively, the digital camera 100 may include the prediction unit, estimate capturing conditions at the time of capturing based on new capturing conditions and the history information, and transmit the estimation result to the server 200 or the interchangeable lens. In this case, the server 200 suffices to generate a recovery filter corresponding to estimated capturing conditions received from the digital camera 100 and transmit it to the digital camera 100.

As described above, the image capturing system according to this embodiment can execute high-quality recovery processing at the time of capturing. More specifically, the image capturing system transmits information indicating set capturing conditions to the information processing apparatus. The information processing apparatus obtains a recovery filter corresponding to predetermined capturing conditions based on the information, and transmits it to the image capturing apparatus. Upon receiving the recovery filter corresponding to the predetermined capturing conditions from the information processing apparatus, the image capturing apparatus stores the filter in the storage device. When an image signal is obtained by capturing, the image capturing apparatus performs recovery processing by applying the received recovery filter to the image signal.

[Modification 1]

The above-described embodiment has explained the mode in which when a preferable recovery filter received from the server 200 does not exist at the stage of performing recovery processing on RAW data obtained by capturing, recovery processing is performed using a spare filter. However, the implementation of the present invention is not limited to this. For example, when a preferable recovery filter does not exist in the temporary storage unit 105 at the stage of performing recovery processing, RAW data may be recorded on the recording medium 120 without performing recovery processing, and after receiving a preferable recovery filter, the data may be read out and undergo recovery processing. In this case, in filter transmission processing by the server 200, if it is determined in step S709 that the recovery filter transmission list does not include capturing conditions at the time of capturing that are to be received, a recovery filter matching the conditions is set as a transmission target with top priority. When the digital camera 100 receives this filter, the recovery processing unit 108 performs recovery processing using the filter on corresponding RAW data without requiring an operation input from the user. Alternatively, when no preferable recovery filter exists in the temporary storage unit 105 at the stage of performing recovery processing, RAW data not to undergo recovery processing may be recorded on the recording medium 120 together with an image having undergone recovery processing using a spare filter. In this case, it is configured to read out data and perform recovery processing after receiving a preferable recovery filter.

[Modification 2]

The following problem may occur in the mode in which RAW data is temporarily recorded on the recording medium 120, and after receiving a preferable recovery filter, is read out again and undergoes recovery processing, as in modification 1. In general, the transfer rate regarding access to the recording medium 120 is lower than that regarding access to the temporary storage unit 105. That is, a longer processing time is necessary in comparison with a case in which recovery processing is performed on RAW data stored in the temporary storage unit 105. Since the problem of the transfer rate may occur even when recording RAW data, the capturing count and the frame rate in continuous capturing may decrease in comparison with a case in which JPEG data is saved. For example, when there are a plurality of RAW data obtained by capturing in an uncommunicable state, the work area of the temporary storage unit 105 is occupied by recovery processing on a plurality of images, and processing using the work area such as capturing processing may not be started.

Considering this situation, it may be configured to allow the user to select, as processing when there is no preferable recovery filter, one of cases in which:

1. recovery processing is not performed (the user selects RAW data and arbitrarily executes recovery processing);

2. recovery processing is performed using a spare filter;

3. recovery processing is performed after waiting for reception of a recovery filter upon capturing (during the standby time); and 4. RAW data not to undergo recovery processing, and image data having undergone recovery processing using a spare filter are stored, and recovery processing is performed on RAW data after waiting for reception of a recovery filter upon capturing (during the standby time).

With this setting, a desired image quality improvement effect by recovery processing can be obtained without sacrificing the response at the time of capturing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-075728 filed Apr. 1, 2014, and 2015-035631 filed Feb. 25, 2015, which are hereby incorporated by reference herein in their entirety.

What is claimed is:

1. An image capturing system including an image capturing apparatus configured to obtain an image signal by capturing, and an information processing apparatus configured to provide, to the image capturing apparatus, a recovery filter for reducing influence that is included in the image signal and arises from an imaging optical system, the image capturing apparatus comprising:

a first CPU; and a first memory storing instructions which, when executed by the first CPU, cause the image capturing apparatus to operate as the following units:

a first transmission unit configured to transmit information indicating a capturing condition to the information processing apparatus;

an obtaining unit configured to obtain an image signal by capturing;

a first reception unit configured to receive a recovery filter corresponding to a predetermined capturing condition from the information processing apparatus and store the recovery filter in a storage unit; and a recovery unit configured to perform recovery processing by applying the recovery filter received by the first reception unit to the image signal obtained by the obtaining unit, and the information processing apparatus comprising:

a second CPU; and a second memory storing instructions which, when executed by the second CPU, cause the information processing apparatus to operate as the following units:

a second reception unit configured to receive the information that has been transmitted by the first transmission unit and represents the capturing condition; and a second transmission unit configured to obtain the recovery filter corresponding to the predetermined capturing condition based on the information indicating the capturing condition, and transmit the recovery filter to the image capturing apparatus, wherein one of the first memory of the image capturing apparatus and the second memory of the information processing apparatus further stores instructions which cause the apparatus to operate as a prediction unit configured to predict a capturing condition set at the time of capturing based on information indicating the capturing condition and information indicating a history of capturing conditions in the image capturing apparatus, and the second transmission unit obtains a recovery filter corresponding to the capturing condition predicted by the prediction unit, and transmits the recovery filter as the recovery filter corresponding to the predetermined capturing condition.

2. An image capturing system including an image capturing apparatus configured to obtain an image signal by capturing, and an information processing apparatus configured to provide, to the image capturing apparatus, a recovery filter for reducing influence that is included in the image signal and arises from an imaging optical system, the image capturing apparatus comprising:

a first CPU; and a first memory storing instructions which, when executed by the first CPU, cause the image capturing apparatus to operate as the following units:

a first transmission unit configured to transmit information indicating a capturing condition to the information processing apparatus;

an obtaining unit configured to obtain an image signal by capturing;

a first reception unit configured to receive a recovery filter corresponding to a predetermined capturing condition from the information processing apparatus and store the recovery filter in a storage unit; and a recovery unit configured to perform recovery processing by applying the recovery filter received by the first reception unit to the image signal obtained by the obtaining unit, and the information processing apparatus comprising:

a second CPU; and a second memory storing instructions which, when executed by the second CPU, cause the information processing apparatus to operate as the following units:

a second reception unit configured to receive the information that has been transmitted by the first transmission unit and represents the capturing condition; and a second transmission unit configured to obtain the recovery filter corresponding to the predetermined capturing condition based on the information indicating the capturing condition, and transmit the recovery filter to the image capturing apparatus, wherein in a case where a recovery filter has not been stored in the storage unit when performing recovery processing, the recovery unit stores the image signal obtained by the obtaining unit without performing recovery processing, and after the first reception unit receives a recovery filter, performs recovery processing on the stored image signal by using the recovery filter.

3. An image capturing apparatus comprising:

a CPU; and a memory storing instructions which, when executed by the CPU, cause the image capturing apparatus to operate as the following units:

an obtaining unit configured to obtain an image signal by capturing;

a prediction unit configured to predict a capturing condition set at the time of capturing based on information indicating the capturing condition and information indicating a history of capturing conditions;

a transmission unit configured to transmit, to an external apparatus, information indicating a capturing condition predicted by the prediction unit;

a reception unit configured to receive a recovery filter corresponding to the predicted capturing condition from the external apparatus; and a recovery unit configured to perform recovery processing by applying the recovery filter received by the reception unit to the image signal obtained by the obtaining unit.

4. An image capturing apparatus comprising:

a CPU; and a memory storing instructions which, when executed by the CPU, cause the image capturing apparatus to operate as the following units:

an obtaining unit configured to obtain an image signal by capturing;

a transmission unit configured to transmit, to an external apparatus, information indicating a set capturing condition;

a reception unit configured to receive a recovery filter corresponding to the capturing condition from the external apparatus; and a recovery unit configured to perform recovery processing by applying the recovery filter received by the reception unit to the image signal obtained by the obtaining unit, wherein in a case where a recovery filter received by the reception unit does not exist when applying recovery processing, the recovery unit stores the image signal obtained by the obtaining unit without performing recovery processing, and after the reception unit receives a recovery filter, performs recovery processing on the stored image signal by using the recovery filter.

5. A method of controlling an image capturing system including an image capturing apparatus configured to obtain an image signal by capturing, and an information processing apparatus configured to provide, to the image capturing apparatus, a recovery filter for reducing influence that is included in the image signal and arises from an imaging optical system, comprising:

in the image capturing apparatus,
a first transmission step of transmitting information indicating a set capturing condition to the information processing apparatus;
an obtaining step of obtaining an image signal by capturing;
a first reception step of receiving a recovery filter corresponding to a predetermined capturing condition from the information processing apparatus and storing the recovery filter in a storage unit; and
a recovery step of performing recovery processing by applying the recovery filter received in the first reception step to the image signal obtained in the obtaining step, and
in the information processing apparatus,
a second reception step of receiving the information that has been transmitted in the first transmission step and represents the set capturing condition; and
a second transmission step of obtaining the recovery filter corresponding to the predetermined capturing condition based on the information indicating the set capturing condition, and transmitting the recovery filter to the image capturing apparatus, wherein
one of the image capturing apparatus and the information processing apparatus further comprises a prediction step of predicting a capturing condition set at the time of capturing based on information indicating the capturing condition and information indicating a history of capturing conditions, and
in the second transmission step, a recovery filter corresponding to the capturing condition predicted in the prediction step is obtained and the recovery filter as the recovery filter corresponding to the predetermined capturing condition is transmitted.

6. The method according to claim 5, wherein
one of the image capturing apparatus and the information processing apparatus further comprises a priority step of setting a priority order for a plurality of recovery filters corresponding to capturing conditions predicted in the prediction step, and
in the second transmission step, a recovery filter obtained based on the priority order set in the priority step is transmitted to the image capturing apparatus.

7. The method according to claim 5, wherein
the information indicating the set capturing condition includes information for specifying a capturing scene,
in the prediction step, a capturing scene, in which capturing is performed based on the information for specifying the capturing scene, is predicted, and
in the priority step, the priority order is set based on the capturing scene which has been specified by the prediction unit and in which capturing is performed.

8. The method according to claim 5, wherein the information processing apparatus further comprises a generation step of generating a recovery filter corresponding to the predetermined capturing condition.

9. The method according to claim 5, wherein in a case where, when an image signal is obtained in the obtaining step, a recovery filter, that corresponds to a capturing condition set when capturing regarding the image signal was performed, and that has been received in the first reception step, has not been stored in the storage unit, recovery processing is performed in the recovery step by applying a spare recovery filter stored in the storage unit.

10. The method according to claim 9, wherein the spare recovery filter is smaller in data amount or recovery effect than the recovery filter received in the first reception step.

11. The method according to claim 5, wherein
the image capturing apparatus further comprises a selection step of selecting, in a case where, when an image signal is obtained in the obtaining step, a recovery filter, that corresponds to a capturing condition set when capturing regarding the image signal was performed, and that has been received in the first reception step, has not been stored in the storage unit, one of a mode in which recovery processing is not performed, a mode in which recovery processing is performed by applying a spare recovery filter stored in the storage unit, and a mode in which recovery processing is performed after receiving the recovery filter corresponding to the capturing condition set when capturing regarding the image signal was performed, and
in the recovery step, recovery processing is controlled according to the mode selected in the selection step.

12. The method according to claim 5, wherein
the capturing condition includes at least one of focal distance, aperture value, and subject distance, and
the capturing condition set at the time of capturing is predicted based on the information indicating the capturing condition, the information indicating a set history of capturing conditions, and information indicating a capturing scene.

13. A method of controlling an image capturing system including an image capturing apparatus configured to obtain an image signal by capturing, and an information processing apparatus configured to provide, to the image capturing apparatus, a recovery filter for reducing influence that is included in the image signal and arises from an imaging optical system, comprising:
in the image capturing apparatus,
a first transmission step of transmitting information indicating a capturing condition to the information processing apparatus;
an obtaining step of obtaining an image signal by capturing;
a first reception step of receiving a recovery filter corresponding to a predetermined capturing condition from the information processing apparatus and storing the recovery filter in a storage unit; and
a recovery step of performing recovery processing by applying the recovery filter received in the first reception step to the image signal obtained in the obtaining step, and
in the information processing apparatus:
a second reception step of receiving the information that has been transmitted in the first transmission step and represents the capturing condition; and
a second transmission step of obtaining the recovery filter corresponding to the predetermined capturing condition based on the information indicating the set capturing condition, and transmitting the recovery filter to the image capturing apparatus,
wherein in the recovery step, in a case where a recovery filter has not been stored in the storage unit when performing recovery processing, the image signal obtained in the obtaining step is stored without performing recovery processing, and after receiving a recovery filter in the first reception step, recovery processing is performed on the stored image signal by using the recovery filter.

14. A method of controlling an image capturing apparatus, comprising:
an obtaining step of obtaining an image signal by capturing;

a prediction step of predicting a capturing condition set at the time of capturing based on information indicating the capturing condition and information indicating a history of capturing conditions;

a transmission step of transmitting, to an external apparatus, information indicating a capturing condition predicted in the prediction step;

a reception step of receiving a recovery filter for reducing influence, that is included in the image signal and arises from an imaging optical system, corresponding to the predicted capturing condition from the external apparatus; and a recovery step of performing recovery processing by applying the recovery filter received in the reception step to the image signal obtained in the obtaining step.

15. A method of controlling an image capturing apparatus, comprising:

an obtaining step of obtaining an image signal by capturing;

a transmission step of transmitting, to an external apparatus, information indicating a set capturing condition;

a reception step of receiving a recovery filter for reducing influence, that is included in the image signal and arises from an imaging optical system, corresponding to the capturing condition from the external apparatus; and a recovery step of performing recovery processing by applying the recovery filter received in the reception step to the image signal obtained in the obtaining step, wherein in the recovery step, in a case where a recovery filter received in the reception step does not exist when applying recovery processing, the image signal obtained in the obtaining step is stored without performing recovery processing, and after a recovery filter is received in the reception step, recovery processing is performed on the image signal by using the recovery filter.

16. A non-transitory computer-readable recording medium recording a program for causing at least one computer to execute a method of controlling an image capturing apparatus, comprising:

obtaining an image signal by capturing;

predicting a capturing condition set at the time of capturing based on information indicating the capturing condition and information indicating a history of capturing conditions;

transmitting, to an external apparatus, information indicating a predicted capturing condition;

receiving a recovery filter for reducing influence that, is included in the image signal and arises from an imaging optical system, corresponding to the predicted capturing condition from the external apparatus; and performing recovery processing by applying the recovery filter received in the reception step to the obtained image signal.

17. A non-transitory computer-readable recording medium recording a program for causing at least one computer to execute a method of controlling an image capturing apparatus, comprising:

obtaining an image signal by capturing;

transmitting, to an external apparatus, information indicating a set capturing condition;

receiving a recovery filter for reducing influence that, is included in the image signal and arises from an imaging optical system, corresponding to the capturing condition from the external apparatus; and performing recovery processing by applying the received recovery filter to the obtained image signal, wherein, in a case where a received recovery filter does not exist when applying recovery processing, the obtained image signal is stored without performing recovery processing, and after a recovery filter is received, recovery processing is performed on the image signal by using the recovery filter.

* * * * *